United States Patent
Chiang et al.

(10) Patent No.: US 12,264,745 B2
(45) Date of Patent: Apr. 1, 2025

(54) MULTI-OUTLET VALVE

(71) Applicant: Michael Chiang, Taichung (TW)

(72) Inventors: Michael Chiang, Taichung (TW);
Mao-Yi Chen, Taichung (TW)

(*) Notice: Subject to any disclaimer, the term of this patent is extended or adjusted under 35 U.S.C. 154(b) by 69 days.

(21) Appl. No.: 18/319,540

(22) Filed: May 18, 2023

(65) Prior Publication Data

US 2023/0375095 A1 Nov. 23, 2023

(30) Foreign Application Priority Data

May 19, 2022 (TW) .................. 111118753

(51) Int. Cl.
| | | |
|---|---|---|
| *F16K 11/085* | (2006.01) | |
| *F16K 5/04* | (2006.01) | |
| *F16K 5/10* | (2006.01) | |
| *F16K 31/60* | (2006.01) | |

(52) U.S. Cl.
CPC ........ *F16K 11/0856* (2013.01); *F16K 5/0407* (2013.01); *F16K 5/10* (2013.01); *F16K 31/60* (2013.01)

(58) Field of Classification Search
CPC ...... F16K 11/0856; F16K 5/0407; F16K 5/10; F16K 31/60; Y10T 137/6058; Y10T 137/86541; Y10T 137/86871
See application file for complete search history.

(56) References Cited

U.S. PATENT DOCUMENTS

| | | | | |
|---|---|---|---|---|
| 3,700,003 | A * | 10/1972 | Smith | F16K 5/0264 251/207 |
| 4,979,530 | A * | 12/1990 | Breda | F16K 11/0856 137/454.2 |
| 5,188,144 | A * | 2/1993 | Radossi | F16K 27/065 251/317 |
| 6,981,521 | B2 * | 1/2006 | Joung | F16K 51/02 137/375 |
| 8,534,642 | B2 * | 9/2013 | Moretz | F16K 11/085 251/181 |
| 8,733,389 | B2 * | 5/2014 | Hong | F16K 11/0856 137/625.42 |
| 10,184,571 | B2 * | 1/2019 | Chen | F16K 11/0853 |
| 10,563,781 | B2 * | 2/2020 | Chen | F16K 11/0743 |
| 10,816,098 | B2 * | 10/2020 | Chen | F16K 1/46 |
| 11,359,743 | B2 * | 6/2022 | Liu | H02K 7/14 |

(Continued)

FOREIGN PATENT DOCUMENTS

| | | | | |
|---|---|---|---|---|
| CN | 206626194 U | * | 11/2017 | |
| DE | 102019124392 A1 | * | 3/2020 | F16K 3/26 |

(Continued)

*Primary Examiner* — Jessica Cahill
(74) *Attorney, Agent, or Firm* — The Law Office of Austin Bonderer, PC; Austin Bonderer

(57) ABSTRACT

This invention relates to a multi-outlet valve, and the valve includes a valve seat, a valve body, and an inlet connector. By the cooperation of the valve seat, the valve body, a fluid-tight anti-leakage effect of the valve core relative to the valve seat can be achieved. By the cooperation of the valve seat and the inlet connector, a twist of the inlet connector relative to a fluid pipe and adversely affecting the service life of the fluid pipe can be avoided during the process of connecting the fluid pipe so as to achieve good structural functionality and stability.

8 Claims, 17 Drawing Sheets

(56) References Cited

U.S. PATENT DOCUMENTS

| | | | |
|---|---|---|---|
| 2004/0040603 A1* | 3/2004 | Shieh | F16K 11/044 |
| | | | 137/597 |
| 2019/0178429 A1* | 6/2019 | Rohde | F16L 37/0885 |
| 2019/0226616 A1* | 7/2019 | Chen | F16L 41/021 |

FOREIGN PATENT DOCUMENTS

| | | | | |
|---|---|---|---|---|
| JP | 6951706 B2 | * | 10/2021 | F16K 11/0873 |
| TW | 625627 U | * | 4/2022 | |

* cited by examiner

MULTI-OUTLET VALVE

FIELD OF THE INVENTION

The present invention relates to an improved structure of a multi-outlet valve, particularly an anti-leakage and anti-twisting structure used in a valve structure.

BACKGROUND

The structure of a conventional multi-outlet valve, according to the prior art, is shown in FIG. 17. The conventional multi-outlet valve includes a valve housing 40 and a valve core 50. The valve housing 40 defines an inner space 41 and comprises a top cover 42. The top cover 42 is fixed on the top side 41 of the inner space 41, a number of valve body outlets 410 surround the inner space 41, and the top cover 42 comprises a shaft hole 420. The valve core 50 comprises a drive shaft 51 and a valve body inlet space 52. The bottom side of the valve body inlet space 52 comprises a bottom side valve body inlet 520, and the valve body inlet space 52 is surrounded by a side valve body outlet 521. The bottom side valve body inlet 520 and the side valve body outlet 521 are opposite to the valve body inlet space 52 and communicate with each other. The valve core 50 is accommodated in the inner space 41, and the drive shaft 51 of the valve core 50 is pivoted through the shaft penetration hole 420 provided in the top cover portion 42 of the valve housing 40. The valve core 50 is relatively rotatable to the inner space 41 of the valve housing 40, and fluid is introduced into the valve body inlet space 52 through the bottom side valve body inlet 520 of the valve core 50 and then expelled out of the lateral valve body outlet 521, by rotating the drive shaft 51 of the valve core 50, As such, the lateral valve body outlet 521 is selectively aligned with any valve body outlet 410 provided around the inner space 41 of the valve housing 40 to discharge fluid.

Although it is expected to achieve the function of selecting fluid in multiple directions, there is, however, a problem of fluid seepage when the valve core 50 controls the fluid discharge relative to the valve housing 40. Further, the valve core 50 comprises a drive shaft 51 and a valve body inlet space 52. The bottom side valve body inlet 520 of the valve core 50 and a fluid pipe connection (not shown in the figure), when the drive shaft 51 is rotated to make the valve core 50 relatively rotate, the fluid pipe connected to the valve body inlet 520 will be relatively twisted. The fluid pipe will be deformed and broken after long-term use. Improvement in the field is thus of desire and need.

SUMMARY OF THE DISCLOSURE

In view of the problems as presented by conventional multi-outlet valve structure, the present invention provides an improved structure of the multi-outlet valve.

One of the aspects of the present invention is to provide an improved structure of a multi-outlet valve. The multi-outlet valve comprises a valve housing. The valve housing comprises a valve housing body. An inner cavity is defined in the valve housing body, and at least one side outlet connector is provided around the valve housing body to communicate with the inner cavity. The top side of the valve housing body comprises a control pivoting portion. The outer surface, near the bottom edge of the valve housing body defines a lateral groove hole on the two sides. A valve body, wherein the valve body comprises a valve core and a valve body control shaft. The valve body control shaft is fixed on the top side of the valve core, the valve core comprises a valve body chamber. The valve body chamber, at the side opposite to the bottom of the valve core, comprises a valve body inlet. The valve body chamber comprises at least one valve body outlet on the side of the valve core. The valve body outlet comprises a valve body outlet flange portion and an inner recessed portion. The valve body outlet flange portion is sleeved with a valve body seat, the inner recessed portion contains a valve body outlet gasket, and the valve body outlet gasket is elastically resisted by the ring-shaped elastic member. The valve core is accommodated in the inner cavity of the valve housing body of the valve housing, the valve body control shaft is coupled to the control pivot part provided on the valve housing body. The valve body outlet of the valve core comprises a lateral valve housing outlet relative to the valve housing body. The valve body seat is configured to push against the valve body outlet gasket and closely adheres to the inner wall of the inner cavity provided in the valve housing body, and is in a fluid-tight conduction state at the opposite side of the valve body outlet joint.

In some embodiments, the outer surface of the valve core comprises several notches in a spaced arrangement. When the valve core is accommodated in the inner part of the valve housing body of the valve housing, the factor notches decrease the outer surface of the valve core, corresponding to a decrease in the contact area between the inner surface of the valve housing body. Thus, the frictional force resulted from mutual rotation is effectively reduced. As such, the smoothness of the rotation of the valve body core relative to the valve housing body is improved to increase the multiple variabilities of the present invention.

In some embodiments, the valve body seat of the inlet connector defines at least one side positioning hole, and the side positioning hole comprises a positioning hole outer wall. The positioning hole outer wall is rounded, and the U-shaped fixing pin comprises a positioning convex portion, the positioning convex portion is rounded. At least one inner side of the U-shaped fixing pin comprises an indent. The U-shaped fixing pin is positioned and inserted into the lateral grooved hole. The inside indent can make the U-shaped fixing pin to be easily guided into the positioning hole, and the positioning convex part arranged in a rounded corner can be relatively stable and simply fixed to the rounded positioning hole outer wall edge of the positioning hole. The U-shaped fixing pin and the positioning hole increase the stability and tightness of the combination between the structures, thereby increasing the multiple variability of the present invention.

In some embodiments, the inner diameter of the valve body seat is larger than the outer diameter of the valve housing body. The inlet connector conduit is protruding from the inner side of the valve body seat with a pair of joint ends, and after the inlet connector is stably fitted with the valve housing, the mating end of the inlet connector conduit is aligned with the valve body inlet of the valve body chamber of the valve core of the valve body. Embodiment of the valve body seat and the valve housing increase the tightness between the structures and increase the multiple variabilities of the present invention.

In some embodiments, the two or three positioning points of the valve housing body are connected to the inner chamber with two or three side valve body outlet joints. The valve core of the valve body core is located on the two sides or three points of the valve body chamber. The valve body core comprises two or three valve body outlets, the valve body outlets are respectively provided with a valve body outlet flange portion and an inner concave portion. The valve body outlet flange portion is sheathed with a ring-shaped elastic member. The inner concave portion contains an outlet nozzle gasket, and the outlet gasket is elastically resisted by the ring-shaped elastic member, and the outlet of the valve body core comprises a lateral outlet joint portion relative to the valve housing body, and the outlet flange of the outlet is provided. When the fluid pressure is 30 psi (2.068e+05 newtons/square meter)~200 psi (1.379e+06 newtons/square meter), the ring-shaped elastic member pushes against the valve body outlet gasket and sealing abuts the inner wall of the inner cavity. Further, the opposite side outlet connector is in a fluid-tight conduction state, providing a stable auxiliary thrust for the outlet gasket so that the friction force of the outlet gasket relative to the inner wall of the inner cavity of the valve housing body under the action of fluid pressure can be reduced. As such, the valve body control shaft of the valve body does not rotate when affected by the fluid pressure, and achieving diversified multiple outlet options, and the multiple variability of the present invention is thus accomplished.

In some embodiments, the valve body core comprises a valve body gasket recess and a plurality of pressure gasket accommodating recess pressure gasket accommodating recesses at the fourth positioning point. The inner surface of the valve body gasket recess has a valve body outlet connected to the inlet chamber. The valve body gasket recess has a valve body outlet gasket with a through hole thereon which includes at least one anti-leakage ring flange on both sides. The anti-leakage ring flange on the inside of the through hole is relatively abutted against the inner surface of the valve body gasket recess. A pressurized positioning hole is located on the inner surface of the pressure gasket accommodating recess connected to the inlet chamber. The pressure gasket accommodating recess comprises a valve body pressure-holding gasket, which has at least one pressure-holding ring flange on both sides surface separately. A pressure-pushing recess is recessed in the inner surface of the pressure-holding ring flange. The pressure-pushing recess and the pressure-holding ring flange are attached against the inner surface of the pressure gasket accommodating recess. The valve body core is accommodated in the inner cavity of the valve housing, the valve body control shaft is combined and coupled to the control pivot of the valve housing body. The anti-leakage ring flange of the outlet gasket in the valve body gasket recess is tightly held against the inner wall of the inner cavity, and the pressure-holding ring flange in the pressure gasket accommodating recess is tightly held against the inner wall of the inner cavity. By rotating the valve body core, the incoming fluid is led to the lateral valve body outlet joint provided in the valve body core through the through hole, and the anti-leakage ring flange at the outer edge of the outlet gasket is in a fluid-tight state relative to the inner side of the lateral valve body outlet joint to prevent the outlet gasket from being deformed by excessive fluid pressure to cause fluid leakage. The incoming fluid is led to the pressure-pushing recess through the pressurized positioning hole so that the valve body pressure-holding gasket is pressed by pressure against the pressure-holding ring flange in a fluid-tight state relative to the inner wall of the inner cavity to prevent the valve body pressure-holding gasket from being deformed by the fluid pressure, causing fluid leakage.

With the cooperation of the valve housing, the valve body, and the inlet connector, the fluid-tight and anti-leakage effect of the valve body relative to the valve housing can be achieved. The cooperation of the valve housing and the inlet connector can avoid connection in the case of a fluid pipe. The inlet connector is twisted relative to the fluid pipe, which affects the service life of the fluid pipe so as to achieve the effectiveness of structural functionality and structural stability.

DETAILED DESCRIPTION

Figure 1:
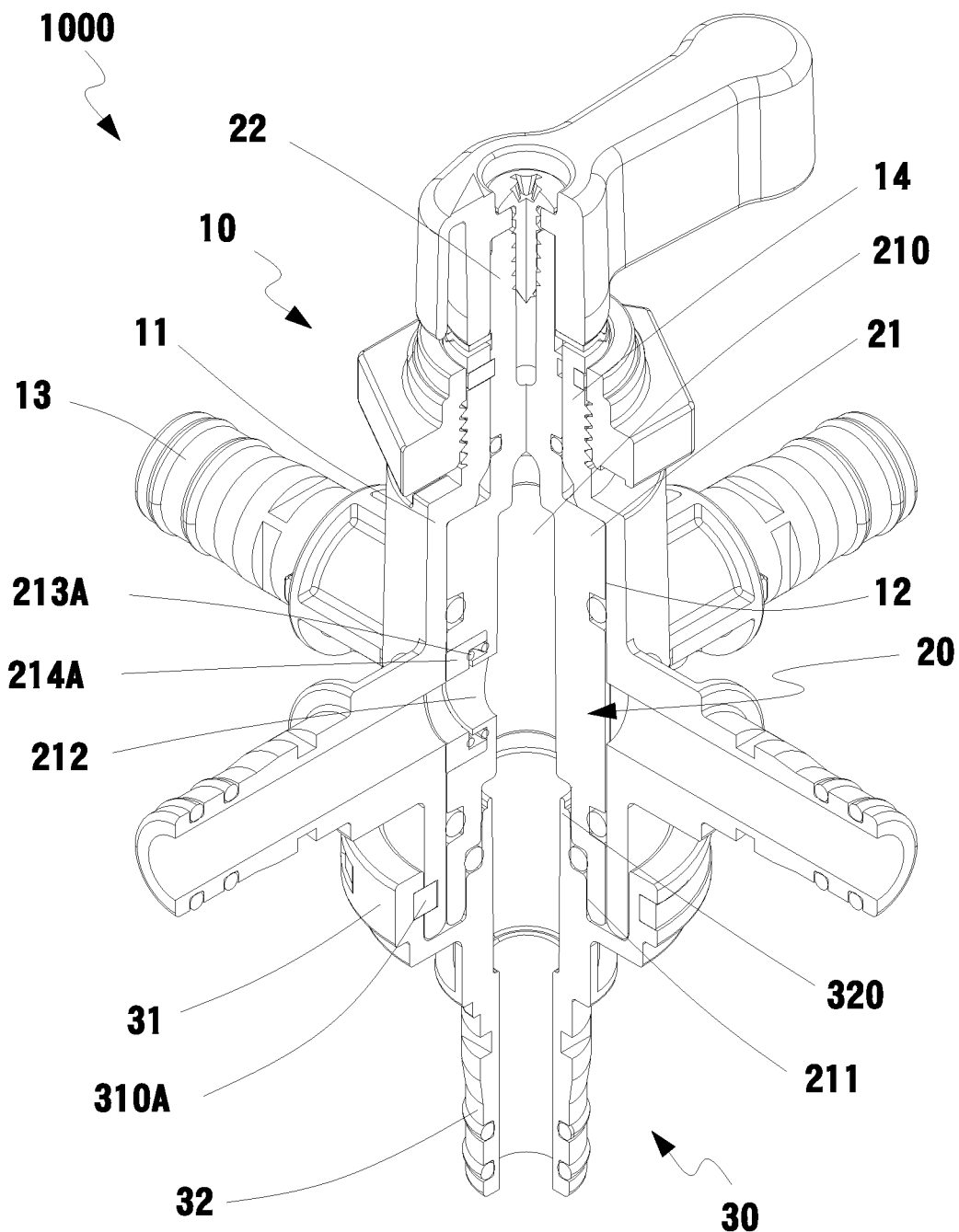
FIG. 1 shows a schematic view of the three-dimensional combined partial cross-sectional state of an embodiment of the multi-outlet valve.
Figure 2:
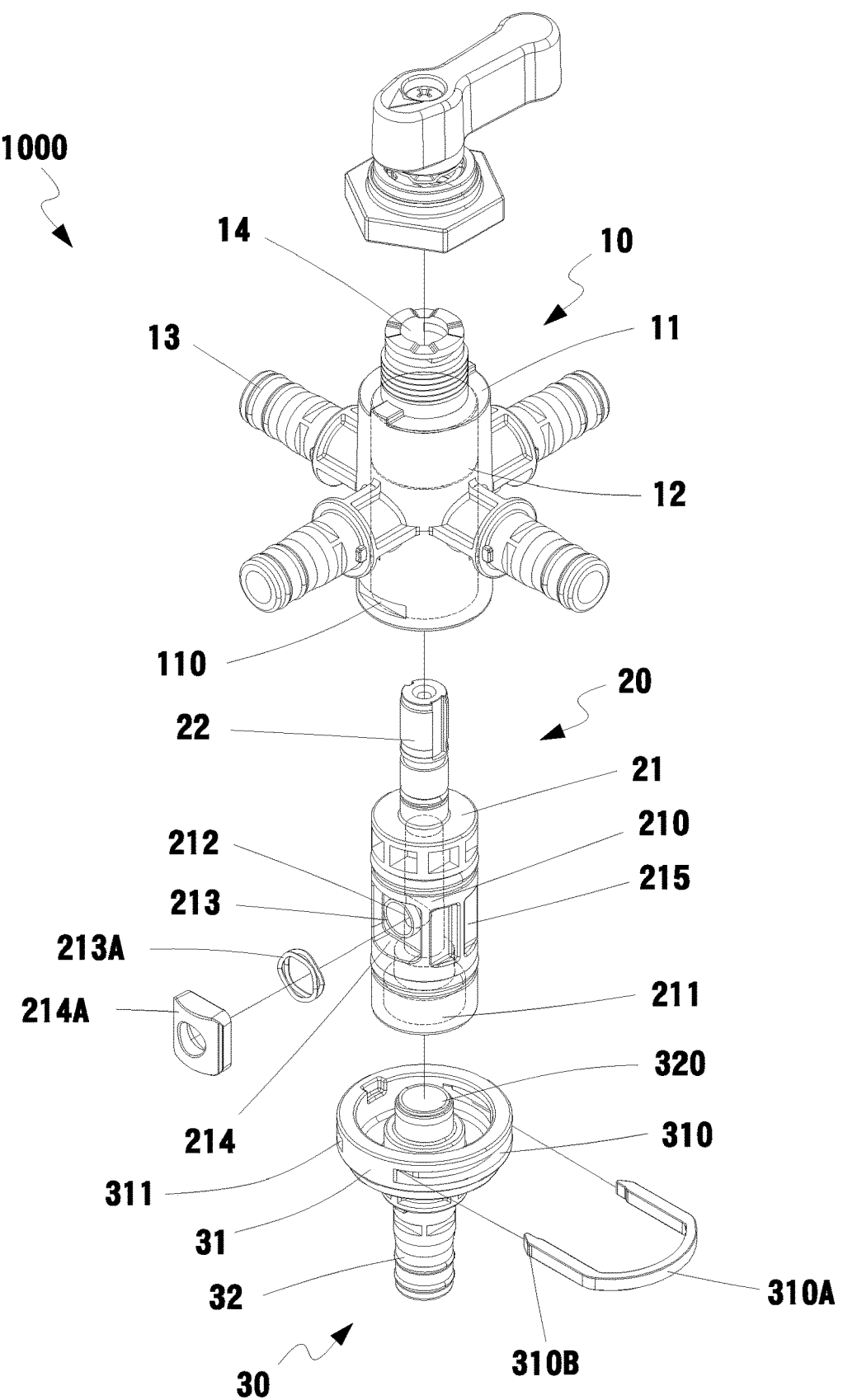
FIG. 2 shows a schematic view of the three-dimensional exploded state of an embodiment of the multi-outlet valve.
Figure 3:
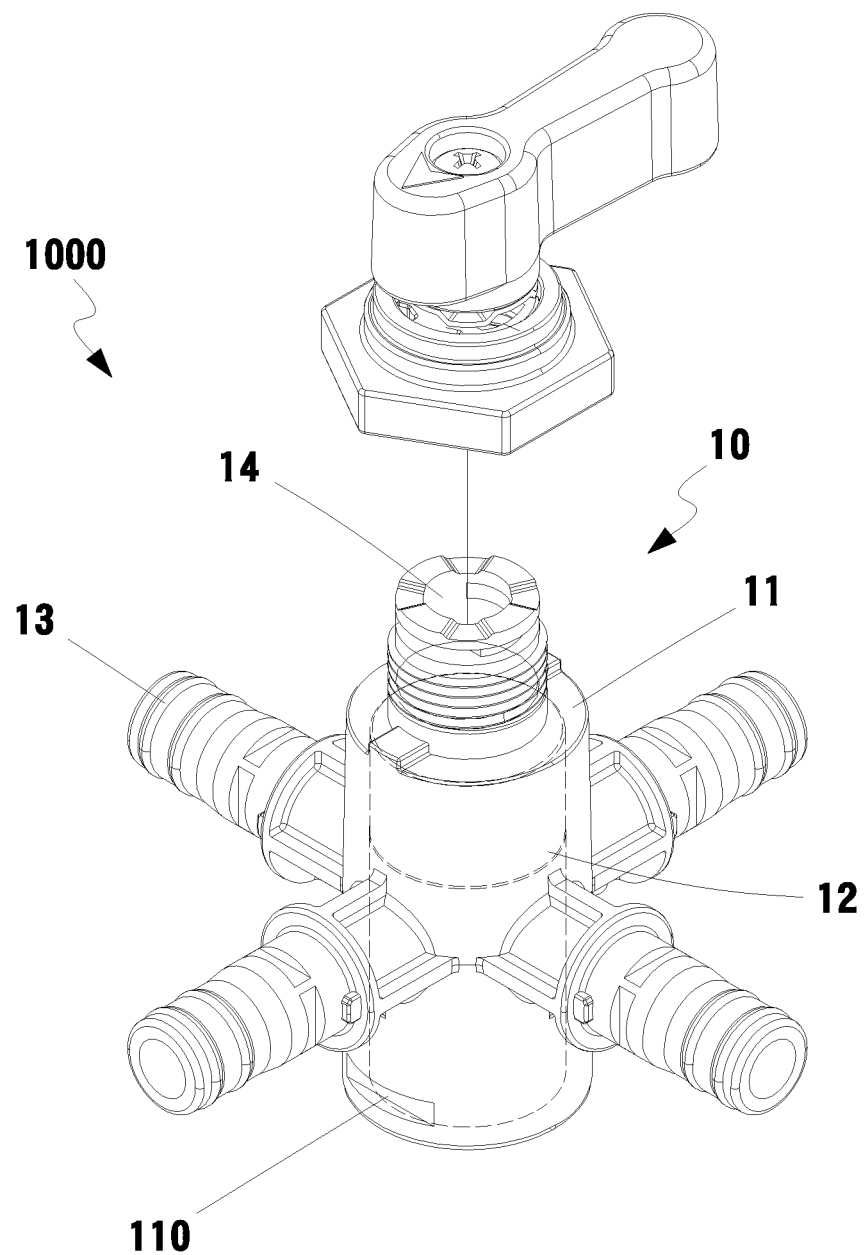
FIG. 3 is a reference view in the three-dimensional partial exploded state of an embodiment of the multi-outlet valve of the present invention.
Figure 4:
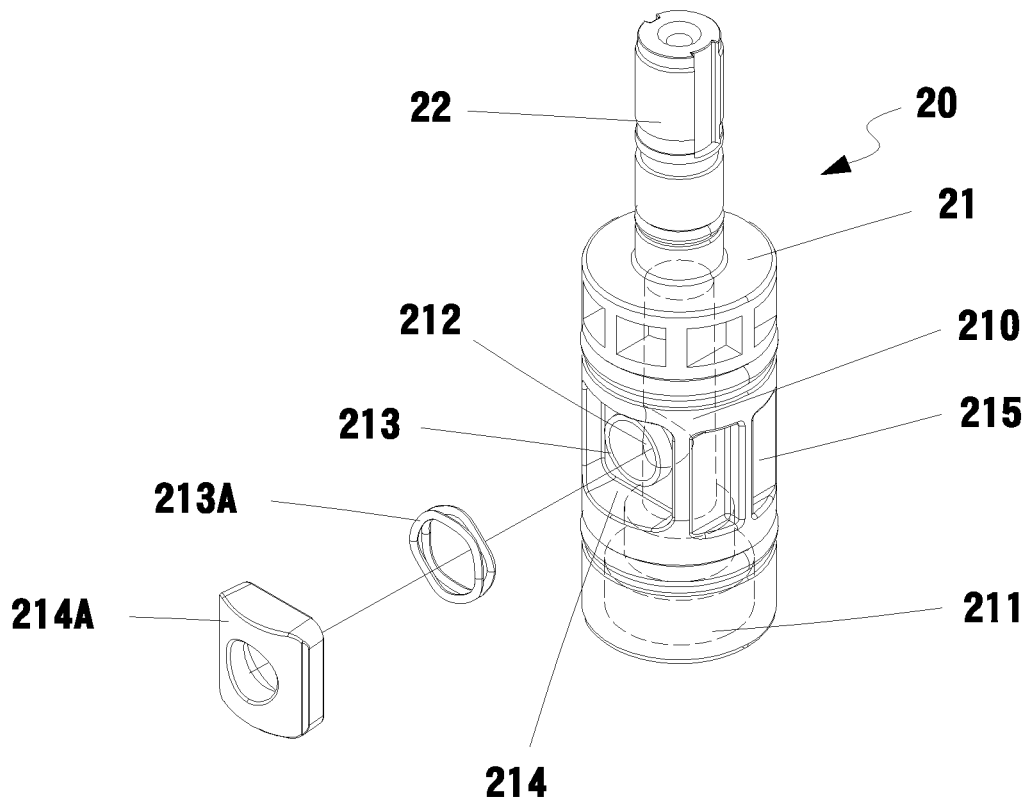
FIG. 4 is a reference view of the three-dimensional exploded enlarged state of the valve housing of an embodiment of the multi-outlet valve of the present invention.

In order to further understand the structure, features, and other purposes of the present invention, the following embodiments are attached with drawings for detailed descriptions as follows. However, the embodiments described in the drawings are for illustrative purposes. It is not the only restriction for the purpose of patent applications.

In some embodiments, the multi-outlet valve 1000 comprises a valve housing 10, a valve body 20, and an inlet connector 30.

In some embodiments, the valve housing 10 comprises a valve housing body 11. The valve housing body 11 defines an inner cavity 12, and the valve housing body 11 is connected to the inner cavity 12 with at least one side facing the valve housing outlet 13. The top side of the valve housing body 11 comprises a control pivot 14, and the outer surface of the valve housing body 11 defines a side locking groove 110 on two sides near the bottom edge.

In some embodiments, the valve body 20 comprises a valve body core 21 and a valve body control shaft 22. In some embodiments, the valve body control shaft 22 is located on the top side of the valve body core 21. In some embodiments, the valve body core 21 comprises a valve body chamber 210, and the valve body chamber 210 comprises a valve body inlet 211 opposite to the bottom side of the valve body core 21. The valve body chamber 210 comprises at least one valve body outlet 212 opposite to the side of the valve body core 21. The valve body outlet 212 comprises a valve body outlet flange portion 213 and an inner concave portion 214, and the valve body outlet flange portion 213 is sleeved with a ring-shaped elastic member 213A. The ring-shaped elastic member 213A is a metal spring. The inner concave portion 214 contains a valve body outlet gasket 214A, and the rear side of the valve body outlet gasket 214A is concave and provided with a through-hole. The valve body outlet gasket 214A is elastically resisted by the ring-shaped elastic member 213A, and its valve body core 21 is accommodated in the valve housing body 11 of the valve housing 10. Inside the inner cavity 12, the valve body control shaft 22 is combined and fixed with the control pivot 14 provided on the valve housing body 11, and the valve body outlet 212 of the valve body core 21 is opposite to the valve housing outlet 13 provided on the valve housing body 11, and the valve body outlet flange portion 213 comprises a ring-shaped elastic member 213A, which biases the valve body outlet gasket 214A to abut to the inner wall of the inner cavity 12, and is in a fluid-tight conduction state at the opposite side of the valve housing outlet 13.

The inlet connector 30 comprises a valve body seat 31 and an inlet connector conduit 32. In some embodiments, the valve body seat 31 and the inlet connector conduit 32 communicate with each other, and the rear side of the valve body seat 31 comprises a lateral groove hole 310 comprising a positioning hole 311 on the front side of the valve body seat 31 opposite to the lateral groove hole 310. A U-shaped fixing pin 310A is inserted into the lateral groove hole 310. The valve body seat 31 is fitted on the bottom side of the valve housing body 11, and the lateral groove hole 310 of the valve body seat 31 is opposite to the side locking groove 110 provided on the outside of the valve housing body 11. The U-shaped fixing pin 310A is used to secure the valve housing 10 to the inlet connector 30.

Reference is next made to the embodiments shown in FIGS. 1 to 7. As can be seen, the embodiments are shown are the three-dimensional combined partial sectional state, three-dimensional exploded state, side partial sectional state, three-dimensional exploded, and enlarged state of the valve housing 10. The three-dimensional exploded and enlarged state of the valve body 20 of an embodiment of the multi-outlet valve 1000. Some embodiments are shown in top view partial cross-section valve body outlet 212 control actuation state and in top partial cross-section. The inlet connector 30 is relatively inserted into the valve housing 10 with a U-shaped fixing pin 310A that can be U-shaped. The reference diagrams for the actuation state of the valve body 20. The valve body core 21 is accommodated in the inner cavity 12 provided in the valve housing body 11 of the valve housing 10. The valve body control shaft 22 is coupled to the control pivot 14 provided in the valve housing body 11. The valve body outlet 212 of the valve body core 21 is opposite to the valve housing outlet 13 provided on the valve housing body 11, and the valve body outlet flange portion 213 of the valve body outlet 212 comprises a ring-shaped elastic member 213A. When the fluid pressure is 30 psi (2.068e+05 newtons/square meter)~200 psi (1.379e+06 newtons/square meter), the ring-shaped elastic member 213A pushes against the valve body outlet gasket 214A in close contact with the inner wall of the inner cavity 12 provided in the valve housing body 11. The opposite valve housing outlet 13 is in a fluid-tight and conductive state, providing the valve body outlet gasket 214A with a stable auxiliary pushing force so that the frictional force of the valve body outlet gasket 214A relative to the inner wall of the inner cavity 12 under the action of fluid pressure can be reduced. Further, the valve body control shaft 22 of the valve body 20 is not affected by the fluid pressure when it rotates, and the valve body seat 31 fits on the bottom side of the valve housing body 11. The lateral groove hole 310 of the valve body seat 31 and the side locking groove 110 are provided on the outside of the valve housing body 11. Relatively, the U-shaped fixing pins 310A are used for relative insertion, securing, and positioning. With the cooperation of the valve housing 10, the valve body 20, and the inlet connector 30, the valve body 20 can be reached relative to the valve housing 10. The fluid-tight and anti-leakage effect of the valve housing 10 and the cooperation of the valve housing 10 and the inlet connector 30 can prevent the inlet connector 30 from twisting relative to the inlet connector conduit 32 when connecting an inlet pipe, which affects the use of the inlet connector conduit 32 longevity, in order to achieve the effect of structural functionality and structural stability.

Figure 5:
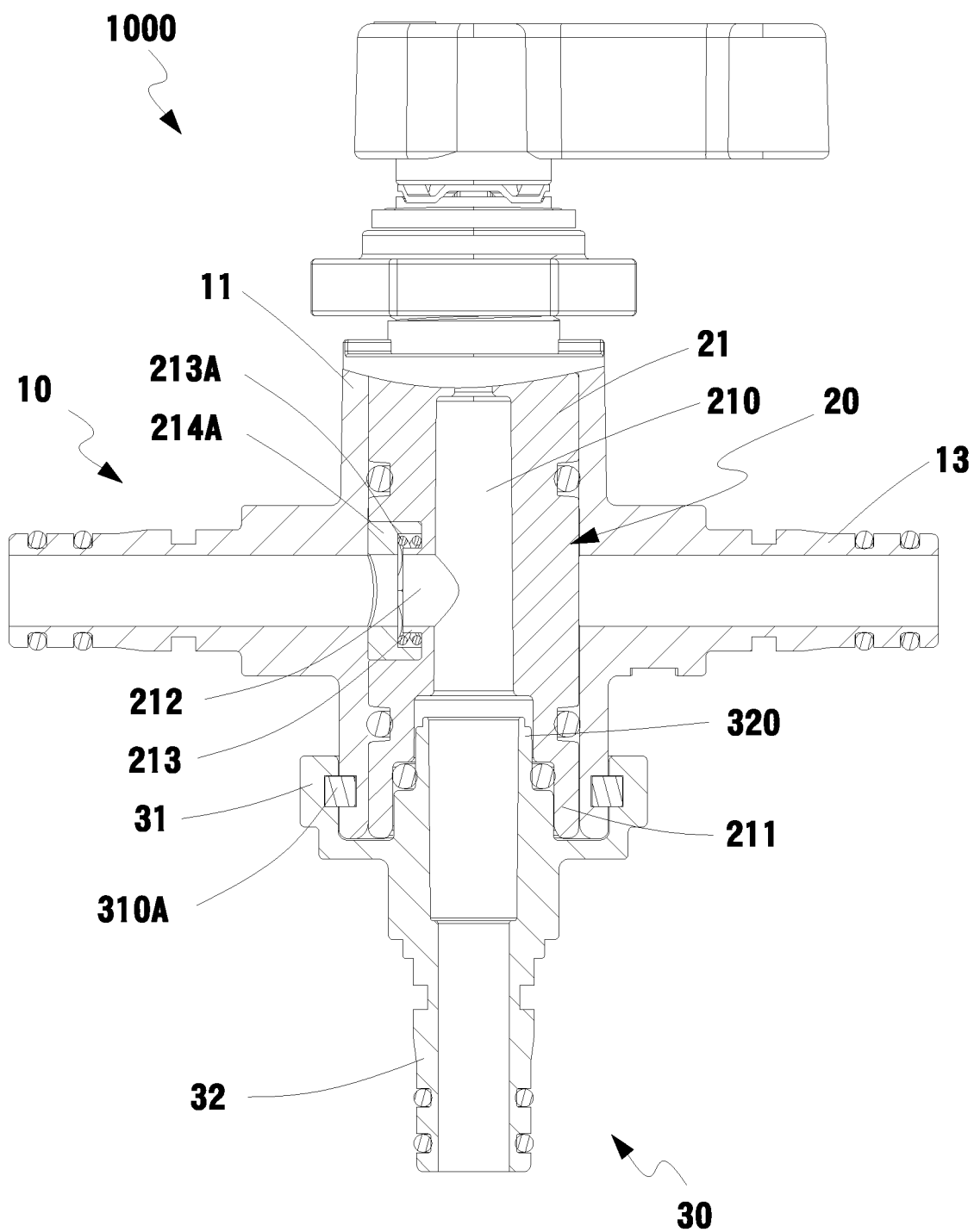
FIG. 5 is a reference side view in the partial sectional state of an embodiment of the multi-outlet valve of the present invention.
Figure 6:
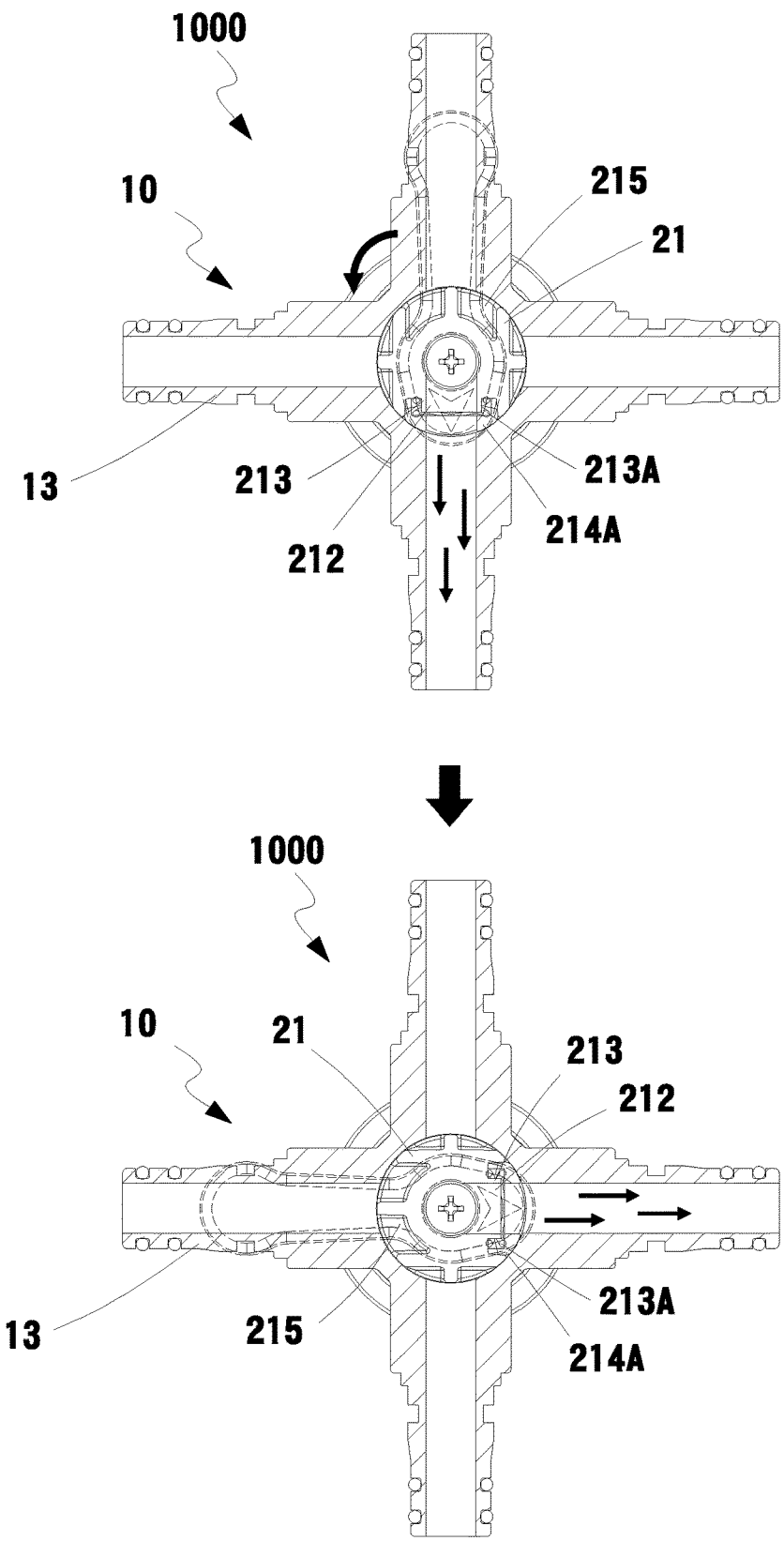
FIG. 6 is a reference diagram of the top view partial cross-section fluid control actuation state of an embodiment of the multi-outlet valve.

Reference is next made to FIG. 5, which is a reference view of the three-dimensional exploded enlarged state of the valve body 20 of an embodiment of the multi-outlet valve 1000. When accommodated in the inner cavity 12, the setting of the notch 215 decreases the outer surface of the valve body core 21 relative to the inner cavity 12 of the valve housing body 11 provided on the valve housing 10. Reducing the contact area of the surface effectively reduces the frictional force of mutual rotation, thereby improving the smoothness of the rotation of the valve body core 21 relative to the valve housing body 11, further increasing the multiple variabilities of the present invention.

Figure 7:
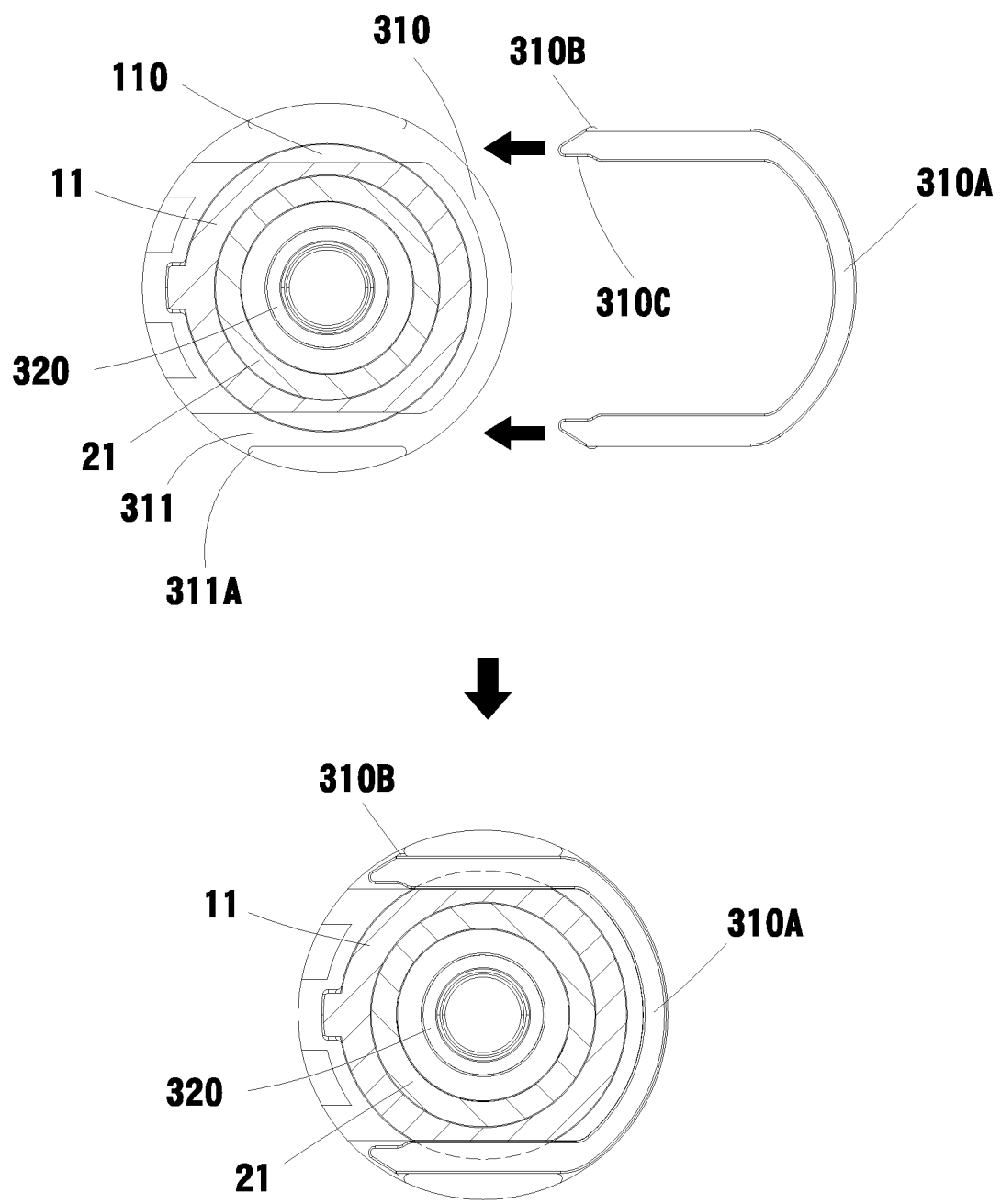
FIG. 7 is a reference diagram of the action state of the inlet connector body of an embodiment of the multi-outlet valve.
Figure 8:
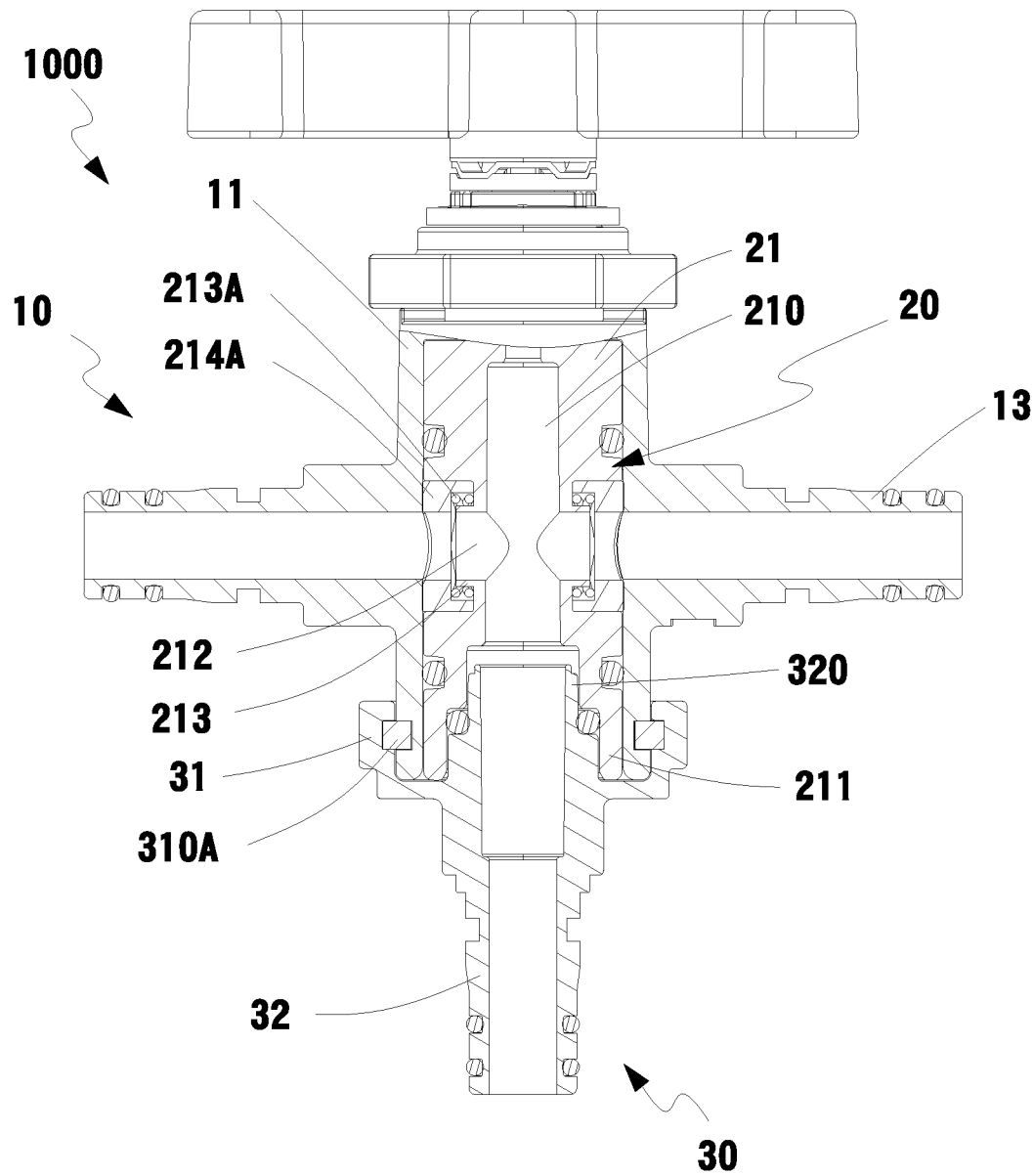
FIG. 8 is an embodiment of the multi-outlet valve.
Figure 9:
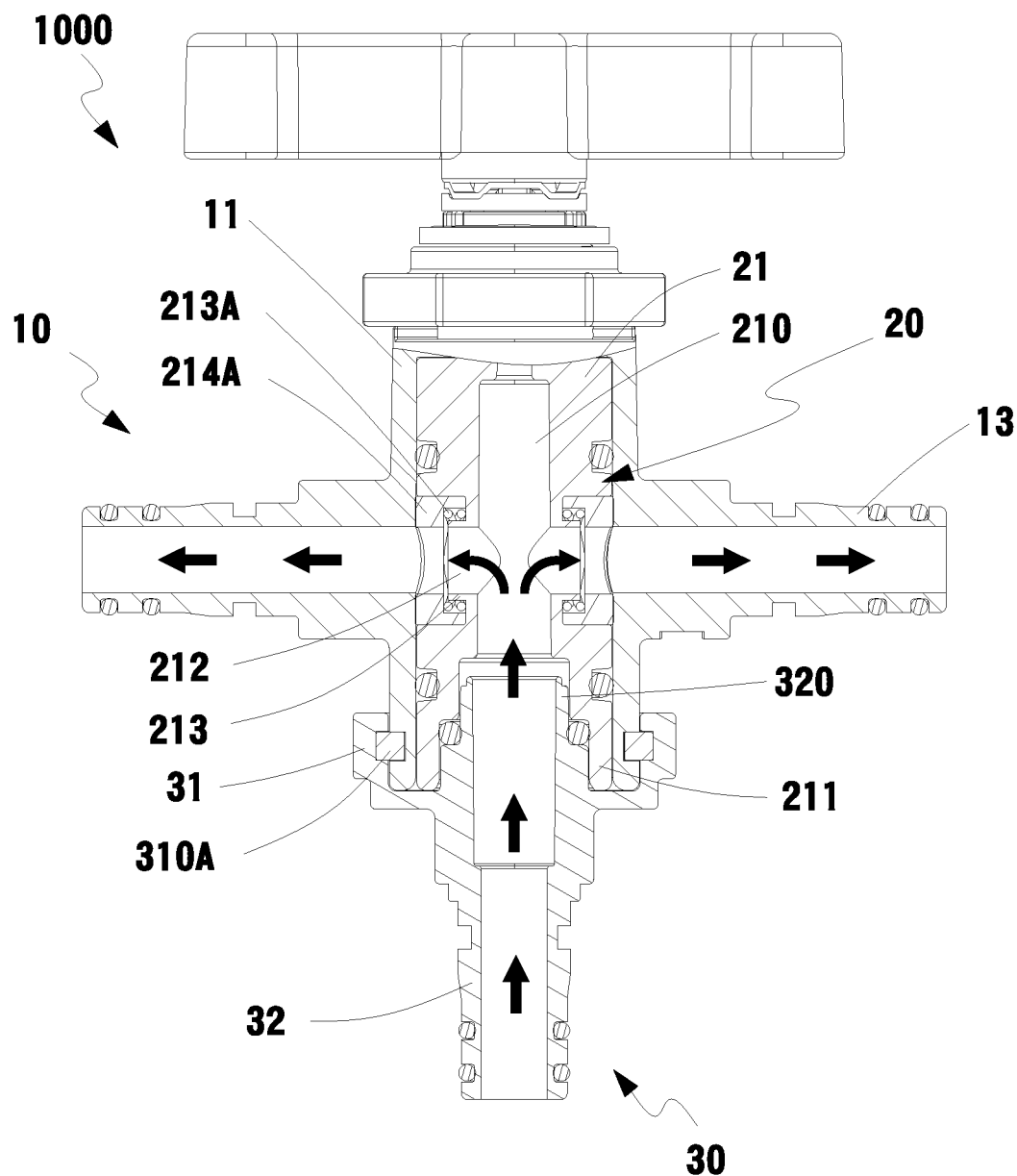
FIG. 9 is an embodiment of an embodiment of the multi-outlet valve.
Figure 10:
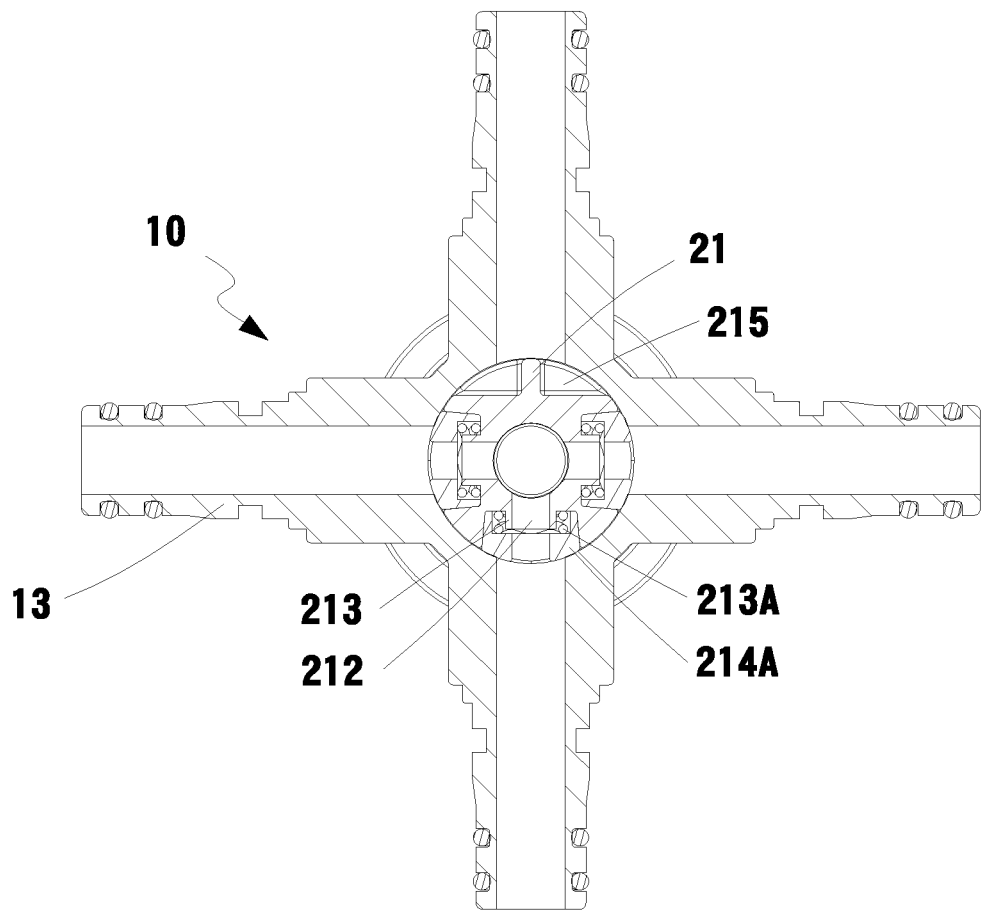
FIG. 10 shows an embodiment of the multi-outlet valve.
Figure 11:
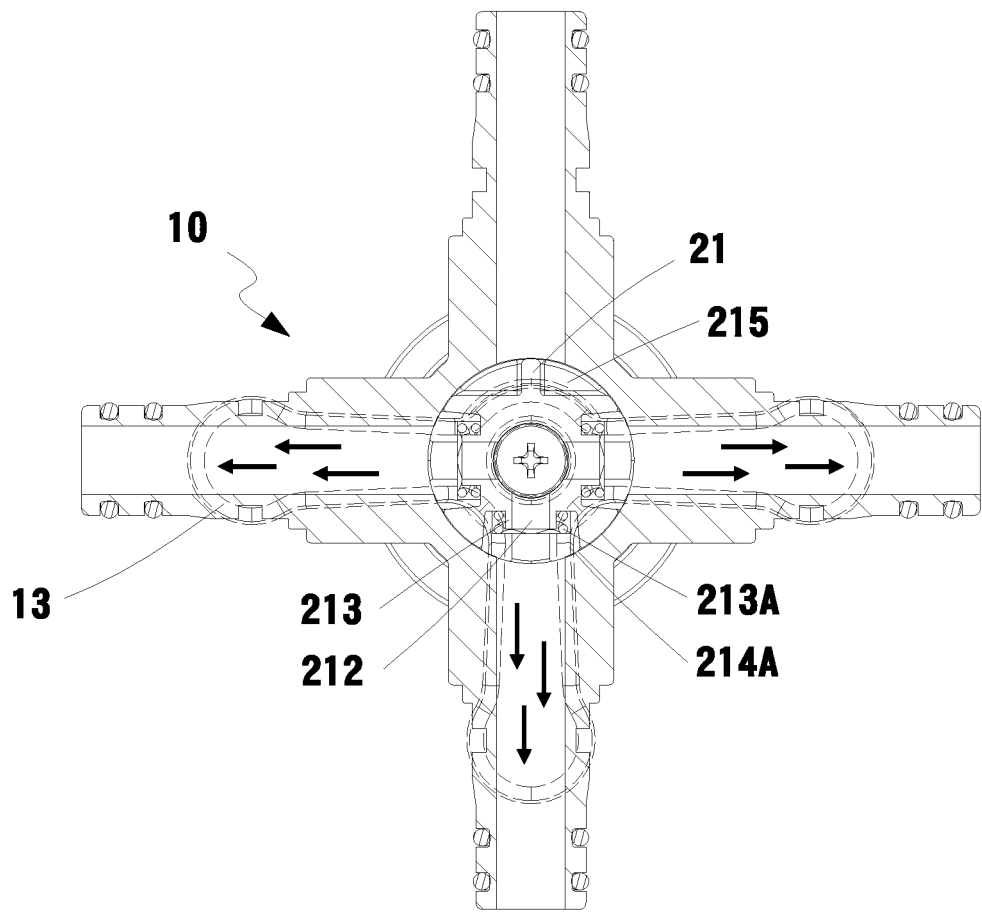
FIG. 11 is an embodiment of the multi-outlet valve
Figure 12:
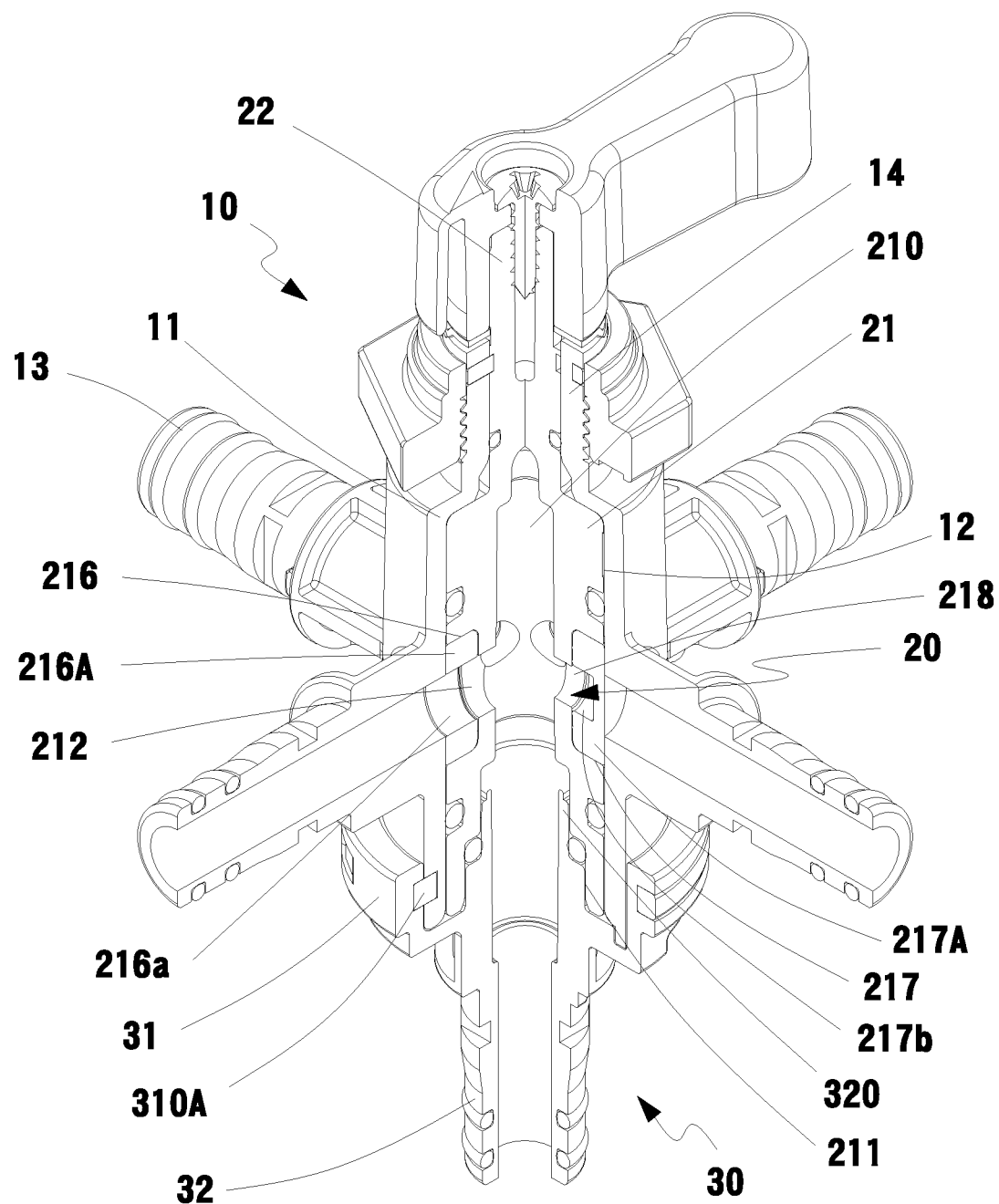
FIG. 12 is a schematic view in the partial cross-sectional state of an embodiment of the multi-outlet valve.
Figure 13:
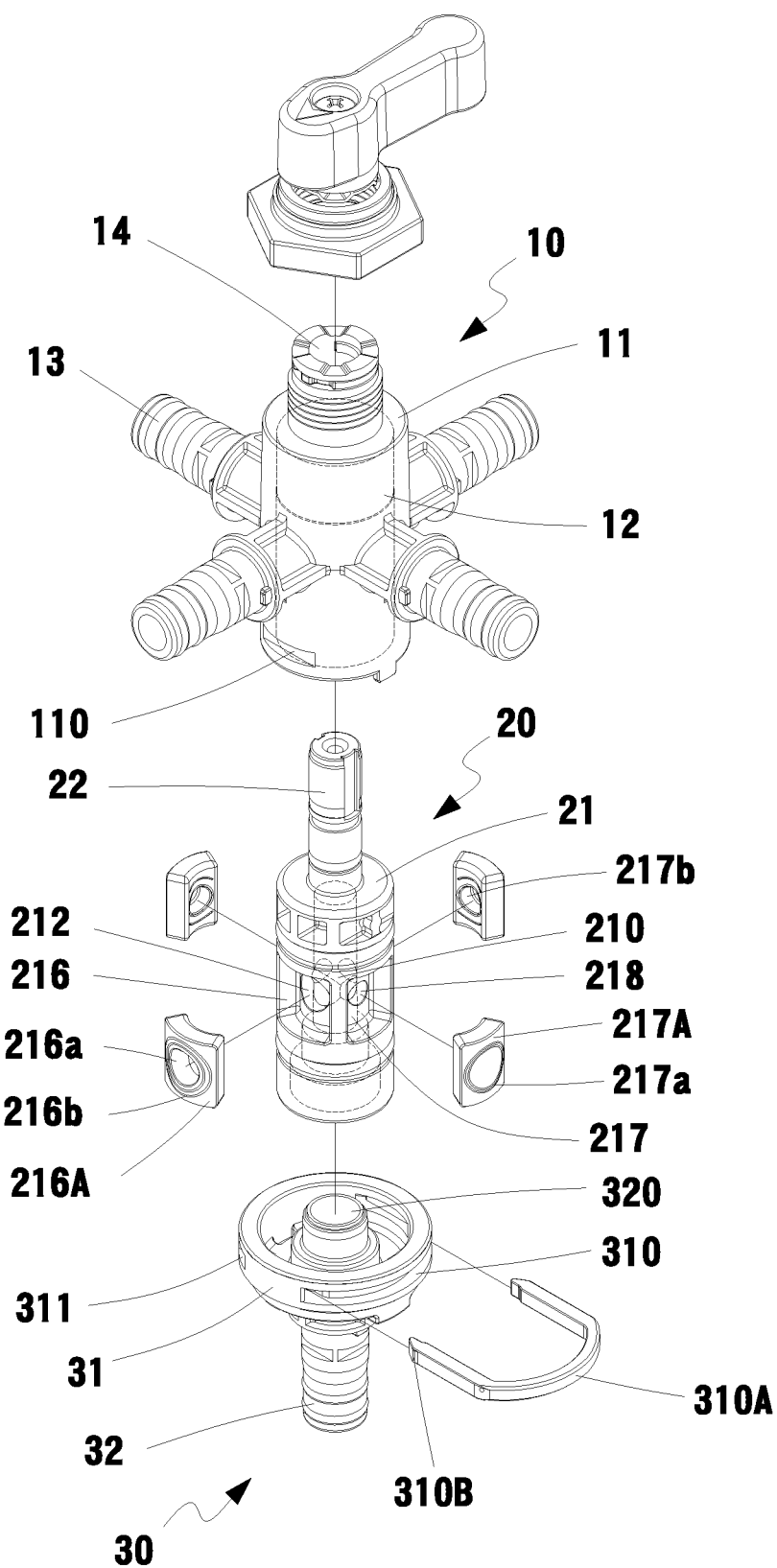
FIG. 13 is a schematic view in the three-dimensional exploded state of FIG. 12.
Figure 14:
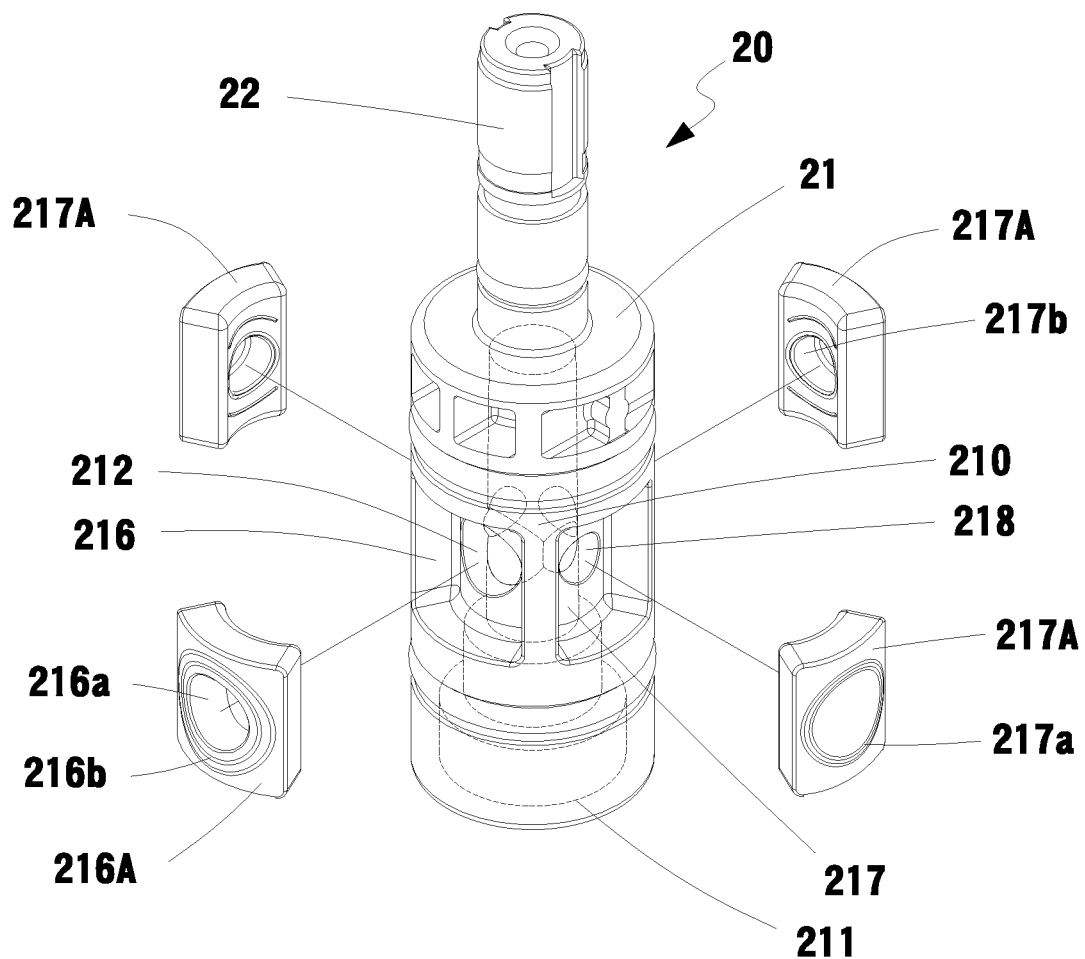
FIG. 14 is a reference view in the three-dimensional, exploded, and enlarged state of the valve housing of FIG. 12.
Figure 15:
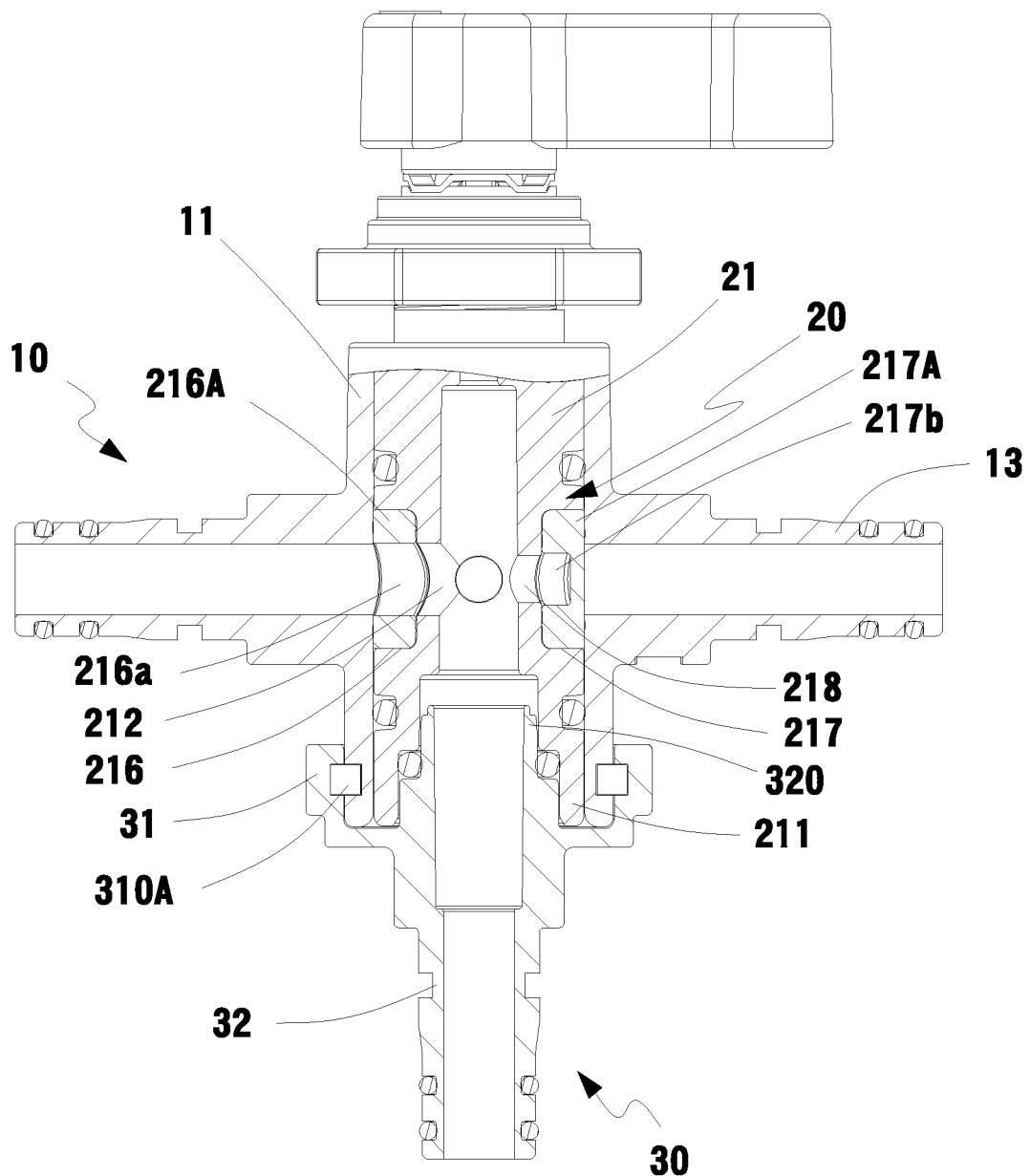
FIG. 15 is a reference side view in the partial sectional state of the FIG. 12.
Figure 16:
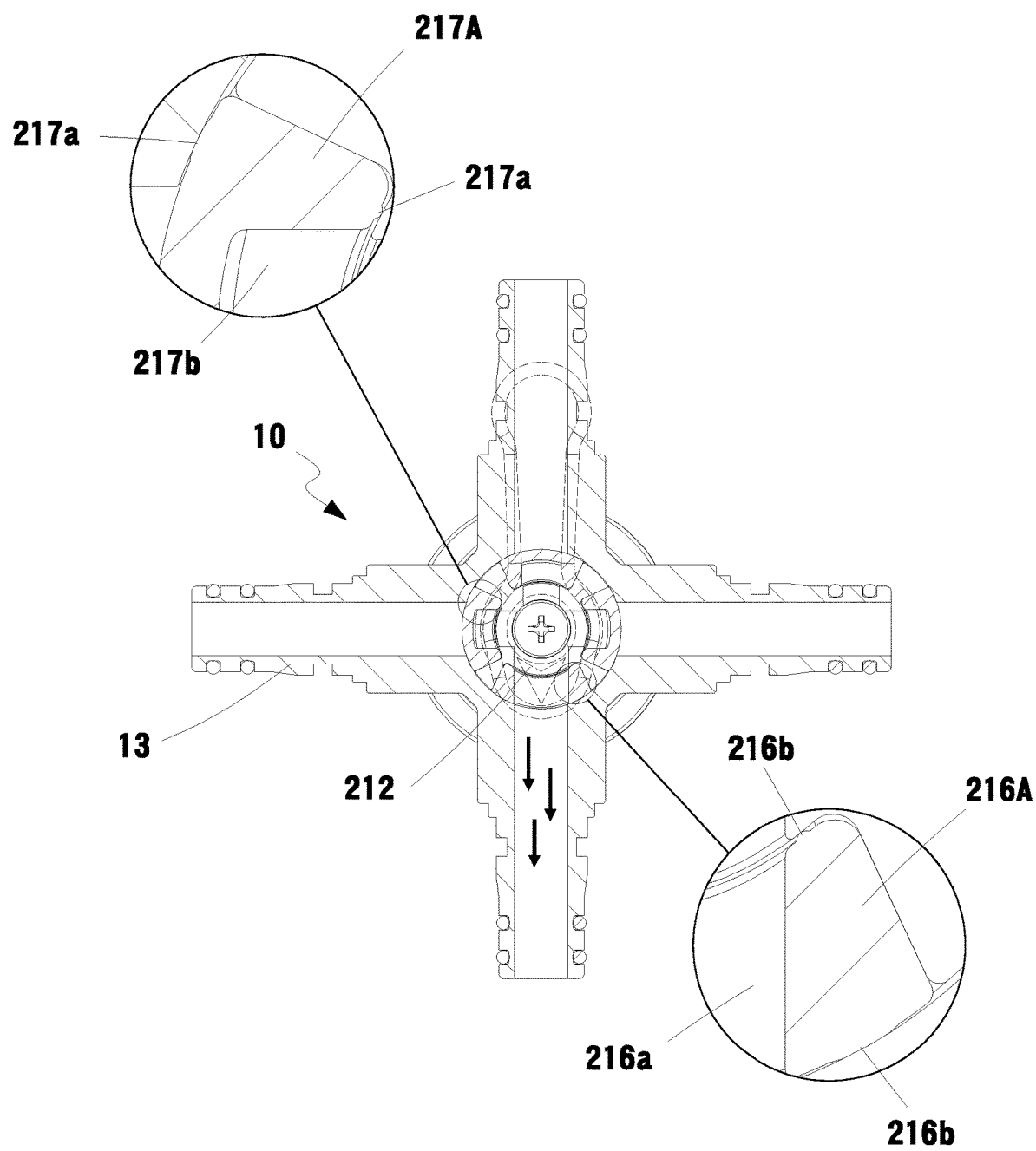
FIG. 16 is a reference top view in the partial, sectional, and enlarged state of the fluid discharge control operation of FIG. 12.
Figure 17:
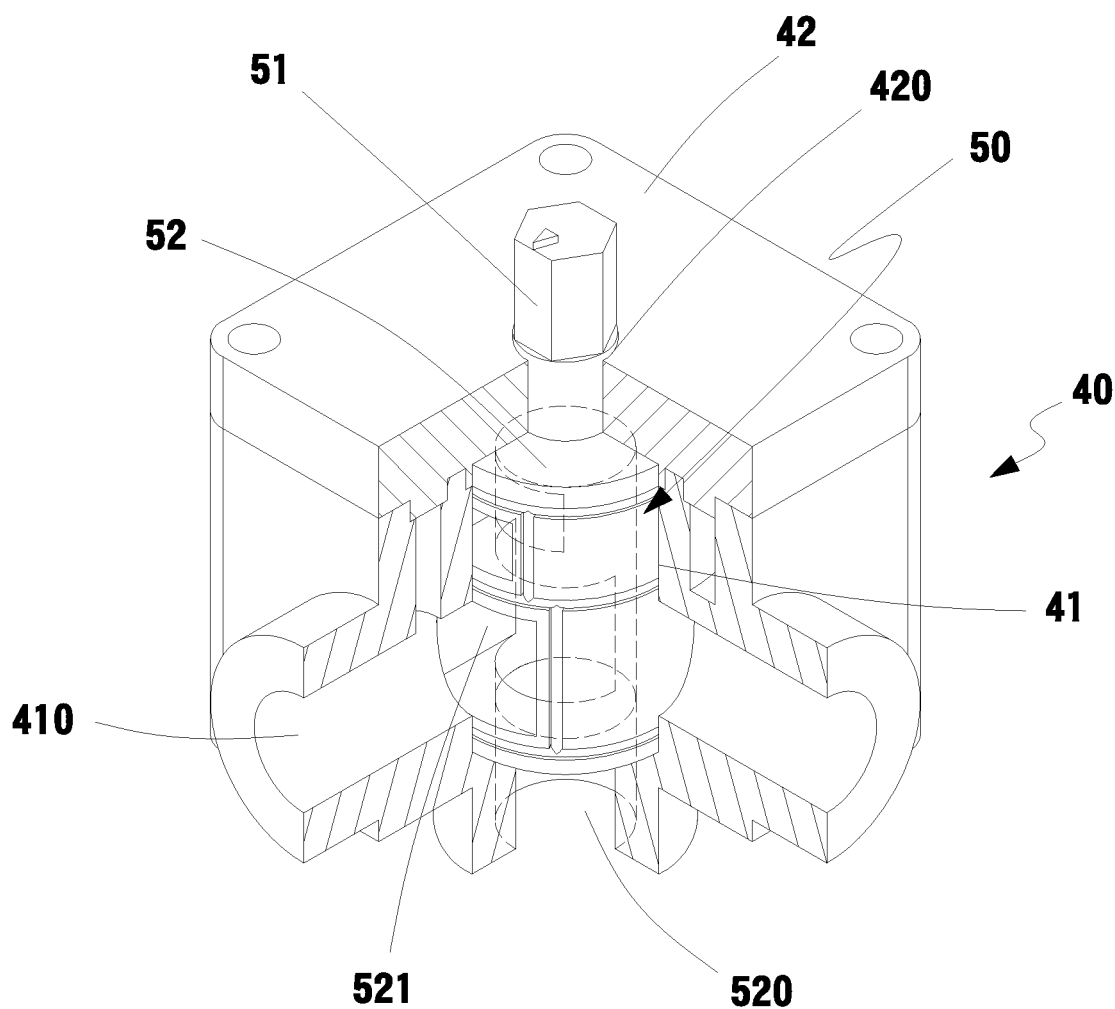
FIG. 17 is a reference view in the partial cross-sectional state of the conventional valve of the prior art.

Reference is made to FIG. 7, which is a top view partial cross-section inlet connector of an embodiment of the multi-outlet valve 1000 with a U-shaped fixing pin 310A for relative insertion and positioning. On the front side of the valve body seat 31 of the inlet connector 30, at least one positioning hole 311 is provided relative to the lateral groove hole 310. The positioning hole 311 comprises a positioning hole outer wall 311A, and in some embodiments, the positioning hole outer wall 311A is rounded. At least one outer side of the U-shaped fixing pin 310A comprises a positioning protrusion 310B, the positioning protrusion 310B is rounded, and at least one inner side of the U-shaped fixing pin 310A is elastic and defines an indent 310C. When the U-shaped fixing pin 310A is inserted into the lateral groove hole 310, the inside indent 310C can make insertion the U-shaped fixing pin 310A simple. To the positioning hole 311, the rounded positioning protrusion 310B can be relatively stable and easily clamped and fixed to the edge of the rounded positioning hole outer wall 311A, which increases the stability and tightness of the connection between the structures. Thus, increasing the multiple variabilities of the multi-outlet valve 1000.

Reference is made to FIGS. 2 to 5, which are the three-dimensional exploded state of an embodiment of the multi-outlet valve 1000. The partial sectional state of the side view, the three-dimensional exploded enlarged state of the valve housing 10, and the three-dimensional exploded enlarged state of the valve body 20, as shown. The inner diameter of the valve body seat 31 is larger than the outer diameter of the valve housing body 11. After the inlet connector 30 is stably fitted to the valve housing 10, the mating end 320 of the inlet connector conduit 32 is aligned with the valve body inlet 211 to improve the tightness between the structures to increase the multiple variabilities of the present invention.

Reference is next made to FIGS. 8 to 11, which show some embodiments of the multi-outlet valve 1000. The side view section state of the second chamber relative to the valve body outlet 212. The seat body of the valve housing 10 of the first embodiment comprises two opposite valve housing outlet 13 and is matched with the valve body core 21 of the valve body 20. In some embodiments, the side view section of the valve body outlet 212 active state of the valve housing 10, has three valve housing outlet 13 on the seat body and matches the three valve body outlets 212. The side view section state of the three valve body outlets 212 and the second implementation example: The seat body of the valve housing 10 comprises three opposite valve housing outlet 13 and is matched with the three valve housing outlets 13. Two or three positioning points are connected to the inner cavity 12 with two or three valve housing outlets 13. In some embodiments, the valve body core 21 comprises the valve body chamber 210. The two sides or three points are positioned relative to the valve body core 21 comprises two or three valve body outlets 212. The valve body outlet 212 is respectively provided with a valve body outlet flange portion 213 and an inner concave portion 214, and the valve body outlet flange portion 213 is sleeved with a ring-shaped elastic member 213A, the inner concave portion 214 contains a valve body outlet gasket 214A, and the valve body outlet gasket 214A is elastically resisted by the ring-shaped elastic member 213A. The valve body outlet 212 of the valve body core 21 comprises a lateral valve body outlet 212 relative to the valve housing body 11. The valve housing outlet 13 and the valve body outlet flange portion 213 of the valve body outlet 212 are provided with a ring-shaped elastic member 213A. When the fluid pressure is between 30 psi (2.068e+05 newtons/square meter) and 200 psi (1.379e+06 newtons/square meter), the ring-shaped elastic member 213A pushes against the valve body outlet gasket 214A and closely adheres to it. The inner wall of the inner cavity 12 is set in the valve housing body 11. The opposite side valve housing outlet 13 is in a fluid-tight and conductive state, providing a stable auxiliary thrust of the valve body outlet gasket 214A, and reducing the valve body outlet gasket 214A under the action of fluid pressure. The friction force of the valve body outlet gasket 214A relative to the inner wall of the inner cavity 12 provided in the valve housing body 11 makes the valve body control shaft 22 of the valve body 20 rotate without being affected by the fluid pressure, achieving a variety of multiple outlet options. Thus, increasing the multiple variabilities of the present invention.

Referring to FIGS. 12 to 16, are the reference views of an embodiment of the multi-outlet valve 1000 of the present invention in the partial sectional state of the three-dimensional assembly, the three-dimensional exploded state, the three-dimensional, exploded and enlarged state of the valve housing 10, the side view partial sectional state, and the top view partial, sectional, and enlarged state of the fluid discharge control operation. In some embodiments, the valve body core 21 comprises a valve body gasket recess 216 and a plurality of pressure gasket accommodating recess pressure gasket accommodating recesses 217 at the fourth positioning point. The inner surface of the valve body gasket recess 216 has a valve body outlet 212 connected to the valve body chamber 210. The valve body gasket recess 216 has a valve body outlet gasket 216A with a through valve body outlet gasket 216A thereon which includes at least one anti-leakage ring flange 216B on both sides. The anti-leakage ring flange 216B on the inside of the through valve body outlet gasket 216A abuts against the inner surface of the valve body gasket recess 216. The pressurized positioning hole 218 is located on the inner surface of the pressure gasket accommodating recess 217 connected to the valve body chamber 210. The pressure gasket accommodating recess 217 comprises a valve body pressure-holding gasket 217A, which has at least one pressure-holding ring flange 217a on both sides surface separately, and a pressure-pushing recess 217b is recessed in the inner surface of the pressure-holding ring flange 217a. The pressure-pushing recess 217b and the pressure-holding ring flange 217a of the valve body pressure-holding gasket 217A are attached against the inner surface of the pressure gasket accommodating recess 217. The valve body core 21 is accommodated in the inner cavity 12, and the valve body control shaft 22 is coupled to the control pivot 14 of the valve housing body 11. The anti-leakage ring flange 216b of the valve body outlet gasket 216A in the valve body gasket recess 216 of the valve body core 21 is tightly held against the inner wall of the inner cavity 12, and the pressure-pushing recess 217b is tightly abuts against the inner wall of the inner cavity 12. By rotating the valve body core 21, the incoming fluid is led to the valve housing outlet 13 provided in the valve body core 21 through the through valve body outlet gasket 216A. The anti-leakage ring flange 216b at the outer edge of the valve body outlet gasket 216A is in a fluid-tight state relative to the inner side of the valve housing outlet 13 to prevent the valve body outlet gasket 216A from being deformed by excessive fluid pressure to cause fluid leakage. The he incoming fluid is led to the pressure-pushing recess 217b through the pressurized positioning hole 218 so that the valve body pressure-holding gasket 217A is pressed by pressure to press against the pressure-holding ring flange 217a in a fluid-tight state relative to the inner wall of the inner cavity 12, and prevents the valve body pressure-holding gasket 217A from being deformed by the fluid pressure to cause fluid leakage. The valve body seat 31 of the inlet connector 30 is coupled to the bottom side of the valve housing body 11, and the lateral groove hole 310 is aligned with the side locking groove 110 provided on the outside of the valve housing body 11, and a U-shaped fixing pin 310A is used secure the valve housing 10 to the inlet connector 30.

The invention claimed is:
1. A multi-outlet valve, comprising:
   a valve housing, wherein the valve housing comprises a valve housing body, an inner cavity is arranged in the valve housing body, at least one side outlet connector is provided around the valve housing body to communicate with the inner cavity, a top side of the valve housing body comprises a control pivoting portion, and an outer surface, near a bottom edge of the valve housing body, comprises a lateral groove hole on two sides of the valve housing body;
   a valve body, wherein the valve body comprises a valve body core and a valve body control shaft, the valve body control shaft is fixed on a top side of the valve body core, the valve core comprises a valve body chamber, the valve body chamber, located on a side opposite to a bottom of the valve body core, comprises a valve body inlet, the valve body chamber comprises at least one valve body outlet on a side of the valve body core, the at least one valve body outlet comprises a valve body outlet flange portion and an inner recessed portion, the inner recessed portion contains a valve body outlet gasket, the valve body core is accommodated in the inner cavity, the valve body control shaft is coupled to the control pivoting portion provided on the valve housing body, the valve body outlet communicates with a lateral valve housing outlet defined by the valve housing body, and the valve body outlet gasket adheres to an inner wall, and is in a fluid-tight conduction state at an opposite side of a valve body outlet joint; and a joint body comprising a set seat and an inlet connector conduit, the set seat and the inlet connector conduit communicate with each other, and a rear side of the set seat defines a lateral slit hole and a positioning hole being provided on a front side of the set seat and opposite to the lateral slit hole, and a U-shaped fixing pin being inserted into the lateral slit hole; the set seat is fitted to a bottom side of the valve housing body, and the lateral slit hole is opposed to a lateral locking groove defined by the outside of the valve housing body, and the U-shaped fixing pin is configured to be inserted into the groove and fix the valve body.

2. A multi-outlet valve of claim 1, wherein the outer surface comprises several notches in a spaced arrangement, when the valve body core is accommodated in an inner part of the valve housing body, the several notches decreases a contact area between the outer surface of the valve body core and an inner surface of the valve housing body.

3. A multi-outlet valve of claim 1, further comprising a ring-shaped elastic member sleeved on the valve body outlet flange portion, wherein the ring-shaped elastic member is a metal spring.

4. A multi-outlet valve of claim 1, wherein two or three positioning points of the valve housing body are connected to an inner chamber with two or three side valve body outlet joints, the valve body core is located on the two sides or three points of the valve body chamber, the valve body comprises two or three valve body outlets, the at least one valve body outlets are respectively provided with the valve body outlet flange portion and the inner recessed portion, the valve body outlet flange portion is sheathed with a ring-shaped elastic member, the inner concave portion contains an outlet nozzle gasket, and the outlet nozzle gasket is elastically resisted by the ring-shaped elastic member.

5. A multi-outlet valve of claim 1, wherein the valve body outlet flange portion is sleeved with a ring-shaped elastic member, and the valve body outlet gasket is elastically resisted by the ring-shaped elastic member, and the ring-shaped elastic member pushes against the valve body outlet gasket and adheres to the inner wall, and is in a fluid-tight conduction state at the opposite side of the valve body outlet joint.

6. A multi-outlet valve of claim 5, further comprising an inlet connector, wherein at least one side positioning hole is provided relative to the lateral slit hole on a front side of a valve body seat of the inlet connector, the at least one side positioning hole comprises a positioning hole outer wall, at least one side of the U-shaped fixing pin is provided, a positioning convex part is defined by the U-shaped fixing pin, and when the U-shaped fixing pin is positioned and inserted in the lateral groove hole, the set position convex part of the U-shaped fixing pin is clamped and fixed to an edge of the positioning hole outer wall.

7. A multi-outlet valve of claim 5, further comprising an inlet connector, wherein an inner diameter of a valve body seat of the inlet connector is larger than an outer diameter of the valve housing body, the inlet connector conduit is protruding from an inner side of the valve body seat with a pair of joint ends, and after the inlet connector is stably fitted with the valve housing, a mating end of the inlet connector conduit is aligned with the valve body inlet.

8. A multi-outlet valve of claim 1, wherein the valve body core comprises a valve body gasket recess and a plurality of pressure gasket accommodating recesses at a fourth positioning point, wherein an inner surface of the valve body gasket recess has a valve body outlet connected to an inlet chamber, and the valve body gasket recess has the valve body outlet gasket with a through hole thereon which includes at least one anti-leakage ring flange on both sides, and the at least one anti-leakage ring flange on the inside of the through hole is relatively abutted against the inner surface of the valve body gasket recess, and a pressurized positioning hole is located on the inner surface of each pressure gasket accommodating recess connected to the inlet chamber; the pressure gasket accommodating recess comprises a valve body pressure-holding gasket, which has at least one pressure-holding ring flange on both sides surface separately, and a pressure-pushing recess is recessed in the inner surface of each pressure-holding ring flange; the pressure-pushing recess and the pressure-holding ring flange are attached against the inner surface of the pressure gasket accommodating recess; the valve body core is accommodated in the inner cavity of the valve housing, the valve body control shaft is combined and fixed to the control pivoting portion of the valve housing body, and the anti-leakage ring flange of an outlet gasket in the valve body gasket recess of the valve body core is tightly held against the inner wall of the inner cavity, and the pressure-holding ring flange of the valve body pressure-holding gasket in the pressure gasket accommodating recess of the valve body core is tightly held against the inner wall of the inner cavity; by rotating the valve body core, incoming fluid is led to a lateral valve body outlet joint provided in the valve body core through the through hole provided in the outlet gasket, and the anti-leakage ring flange at an outer edge of the outlet gasket is in a fluid-tight state relative to the inner side of the lateral valve body outlet joint provided by the valve housing to prevent the outlet gasket from being deformed by excessive fluid pressure to cause fluid leakage, and the incoming fluid is led to the pressure-pushing recess provided by the valve body pressure-holding gasket through the pressurized positioning hole of the pressure gasket accommodating recess so that the valve body pressure-holding gasket is pressed by pressure and pushed against the pressure-holding ring flange in the fluid-tight state relative to the inner wall of the inner cavity to prevent the valve body pressure-holding gasket from being deformed by the fluid pressure to cause fluid leakage.

* * * * *